(12) United States Patent
Gardner et al.

(10) Patent No.: US 10,969,556 B1
(45) Date of Patent: Apr. 6, 2021

(54) METHOD AND APPARATUS FOR REMOVING OPTIC FIBER FROM MULTIPLE SPOOLS

(71) Applicant: NET RECYCLING LLC, Wilmington, NC (US)

(72) Inventors: Thomas Gardner, Wilmington, NC (US); Forrest Cleveland Bacon, Brownsburg, IN (US); Martin Lee Rice, Wilmington, NC (US)

(73) Assignee: NET RECYCLING, LLC, Wilmington, NC (US)

( * ) Notice: Subject to any disclaimer, the term of this patent is extended or adjusted under 35 U.S.C. 154(b) by 462 days.

(21) Appl. No.: 15/812,577

(22) Filed: Nov. 14, 2017

Related U.S. Application Data

(60) Provisional application No. 62/602,412, filed on Apr. 24, 2017.

(51) Int. Cl.
| | |
|---|---|
| *B65H 54/02* | (2006.01) |
| *D03J 1/16* | (2006.01) |
| *B65H 54/22* | (2006.01) |
| *G02B 6/44* | (2006.01) |
| *G02B 6/46* | (2006.01) |

(52) U.S. Cl.
CPC .......... *G02B 6/4457* (2013.01); *B65H 54/02* (2013.01); *B65H 54/22* (2013.01); *D03J 1/16* (2013.01); *G02B 6/4452* (2013.01); *G02B 6/46* (2013.01)

(58) Field of Classification Search
CPC ........ G02B 6/4457; G02B 6/24; B65H 73/00; B65H 54/22; B65H 54/78; B65H 67/044; B65H 67/0434; B65H 67/0422; B65H 67/0417; B65H 57/00; B65H 65/00; B29C 53/8016; B29C 53/56; B29C 53/562; D03J 1/16
USPC ........... 242/443, 42, 474.7, 157.1, 128, 476; 28/294, 264
See application file for complete search history.

(56) References Cited

U.S. PATENT DOCUMENTS

| | | | | |
|---|---|---|---|---|
| 4,267,983 | A | * 5/1981 | Leu ...................... | B65H 67/085 242/476 |
| 4,571,931 | A | * 2/1986 | Kupper .................... | D01H 9/18 198/570 |

(Continued)

OTHER PUBLICATIONS

"Carousel" Dictionary.com. Web. https://www.dictionary.com/browse/carousel.*

*Primary Examiner* — Jillian K Pierorazio
(74) *Attorney, Agent, or Firm* — Russell D. Nugent; The Humphries Law Firm, P.C.

(57) ABSTRACT

A method and apparatus for removing optic fibers from multiple spools of optic fiber involving one or more rotating trees on which spools of optic fiber are seated, a transport passage and a rotating carousel. The free end of a fiber is pulled through the passage and attached to the rotating carousel such that the rotation of the carousel removes the rest of the fiber from the spool(s). The passage can be equipped with one or more rollers to reduce the friction between the fibers and the passage. The carousel may feature retractable rails to facilitate removing the fibers. The passage may also feature a blower and/or a venturi that provides suction to facilitate the movement of one or more fibers through the passage. A reciprocating tracking unit can be used to spread the fibers onto the carousel.

8 Claims, 4 Drawing Sheets

(56) References Cited

U.S. PATENT DOCUMENTS

| | | | | |
|---|---|---|---|---|
| 4,772,174 A | * | 9/1988 | Kupper | B65H 67/069 198/465.2 |
| 4,798,346 A | * | 1/1989 | Myers | G02B 6/4457 242/474.9 |
| 5,056,728 A | * | 10/1991 | Scaglia | B65H 67/08 226/97.4 |
| 5,065,928 A | * | 11/1991 | Davey | B65H 51/16 226/7 |
| 5,123,608 A | * | 6/1992 | LeCompte | B65H 49/02 226/97.4 |
| 5,322,228 A | * | 6/1994 | Nagayama | B65H 54/88 242/476.6 |
| 6,027,062 A | * | 2/2000 | Bacon | B65H 57/003 242/474.7 |
| 2013/0098525 A1 | * | 4/2013 | Aumueller | B65H 59/02 156/64 |
| 2013/0193623 A1 | * | 8/2013 | Kashikar | B29B 15/122 264/518 |
| 2013/0248637 A1 | * | 9/2013 | Tanigawa | B29C 63/08 242/443 |

* cited by examiner

METHOD AND APPARATUS FOR REMOVING OPTIC FIBER FROM MULTIPLE SPOOLS

CROSS-REFERENCE TO RELATED APPLICATIONS

This Application claims the benefit of priority to U.S. Provisional Application No. 62/602,412 filed on Apr. 24, 2017. The content of U.S. Provisional Application No. 62/602,412 filed on Apr. 24, 2017 is incorporated by reference in its entirety.

BACKGROUND OF THE INVENTION

(a) Field of the Invention

The present invention is in the technical field of industrial recycling; specifically, recovery of the spools on which strands of optic fiber are stored. More particularly, the present invention relates to an apparatus and method for quickly removing strands of optic fibers from more than one spool at a time.

(b) Background Art

A fiber optic cable is a high speed network cable that is made up of a number of strands of optic fibers joined together in a protective jacket usually made of polymers. The individual strands of optic fibers are composed of an inner cylindrical core that is generally made of glass or plastic. The cylindrical core of an optic fiber provides a pathway that allows light generated by lasers or LEDS, to pass. In addition, the core is surrounded by a layer of glass or plastic referred to as cladding that prevents loss of light by reflecting light back into the core of the glass strand.

Compared to conventional wired cables, strands of optic fiber can transmit more data over longer distances. In addition, since transmissions are made using light pulses, the information is transmitted digitally and there is less need for signal boosters and the cables are less susceptible to interference. These cables are increasingly common in internet, cable television and telephone systems.

Optic fibers are more susceptible to damage by pulling, bending, twisting or crushing force than traditional wired cables. As a result, proper storage of optic fibers is crucial. Optic fibers are typically stored on spools. Single strands of optic fiber are uniformly wound around the center cylinder of a spool and stored in a horizontal orientation for later use. If spooled optic fibers fail quality control testing, generally the entire spool is discarded with the optic fiber still attached. As a result, functional spools are routinely discarded and there is currently a market for previously used spools. Consequently, once the defective strands of optic fiber are removed from their spools, the spools can be refurbished and/or repurposed for later use.

Traditionally, if someone wanted to save the spool and discard the attached optic fiber, they would use a machine that holds the spool in place by its central cylinder while allowing it to rotate. Such a machine would allow or cause the spool to spin in place allowing someone to pull the optic fiber from its spool. However, traditional methods of removing optic fiber generally involve rotating one spool at a time. In addition, a skilled artisan will know that rotating a spool around its longitudinal axis has the potential to damage the spool, namely the axle, making it unsuitable for reuse. As a result, there is a need in the industry for a method and apparatus that can be used to remove strands of optic fiber from multiple spools in a shorter period of time without damaging the spools themselves.

BRIEF SUMMARY OF THE INVENTION

The present invention includes an apparatus and method for removing strands of optic fiber at the highest, most effective speed possible from more than one spool at a time without damaging the spool or risking injury and minimizing the need for human labor.

Initially, the inventors devised a rotating carousel that could be used to accumulate optic fiber once removed from spools. Specifically, the carousel is a structure with a central axis around which it can be rotated. Single strands of optic fiber can be fixed to the carousel and then the rotation of the carousel can pull the rest of the fiber off of the spool. In an attempt to increase the speed at which the optic fibers can be de-spooled, the inventors devised a rack that holds multiple spools in place, generally horizontally, and are placed near the rotating carousel. The rotating carousel can pull fibers from multiple spools in this manner. However, there are a handful of drawbacks in this design not the least of which is that the design is dangerous to the workers operating it. Lines of optic fiber are very thin and are hard to see when they are stretched between the spool and the carousel and workers can be injured by walking into such fibers. In addition, multiple workers are required to maximize the use of such a design as racks of spools have to be positioned around the carousel to ensure that the carousel is removing as much fiber as possible at any given time. The speed at which the process is performed dictates profitability to a large extent as each spool of fiber can hold miles of optic fiber.

As a result, the inventors redesigned their system and made two very important changes. First, they created a new structure configured to hold spools of optic fiber. Instead of racks of spools of fiber positioned near the carousel, the spools of fiber are placed on a rotatable structure with a central axis and one or more annular shelves oriented horizontally around the axis. The device henceforth referred to as a tree or spool tree, can feature more than one shelf or platform above or below each other platform. Each platform or shelf has one or more circular protrusions or lips on its upper surface each sized to a allow spool of optic fiber to sit vertically in place on the shelf—the protrusion or lip being sized to hold the spool in place. This spool tree allows a single operator to de-spool sixteen or more spools at one time. The size of the spool tree is dictated only by the average length of a human arm. As will be discussed below, the operator must be able to reach across the top of the spool tree to reach a port located above the tree's central axis. In preferred embodiments and the anticipated best mode of the spool tree, the spools are separated by walls that form one or more compartments on the platform.

In the anticipated best mode, the platform holds each of the spools in a vertical orientation (see FIG. 1) such that the optic fiber is removed from each spool on the spool tree. Typically, strands of optic fiber come wound on a cylinder flanked by two end pieces or flanges. Vertically oriented means that the spool has been rotated perpendicular to the longitudinal axis of the cylinder such that the spool is positioned with one flange down facing or in contact with the platform and the other flange facing away from the platform. In the anticipated best mode of this device, the platform of the spool tree is positioned horizontally with a plurality of compartments, each compartment having a horizontally oriented eye through which the optic fiber of each individual spool is threaded. Alternately, the eye can be vertically oriented or positioned. The eye, while not a completely necessary feature, is present in preferred embodiments to guide the strands of optic fibers away from the compartment towards the entrance or port to a passage located above the spool tree without the fibers from different spools becoming entangled with each other. Ideally, the eye is placed above each spool on the tree.

In addition, the inventors have devised a closed system to transport the optic fibers from the spools from which they are being removed to the carousel, eliminating or at least minimizing the dangers of having optic fibers stretched from the spool tree to the carousel. Adjacent to or preferably above the spool tree's central axis there is located a transport tube leading away from the spool tree, consisting of a pipe or passage with a port or entry located adjacent to the spool tree. In preferred embodiments, the entry to the passage is a bugle-shaped port and the passage is a metal pipe. The passage allows for the transportation of the fibers from one part of the work space to another part in an enclosed space that prevents someone from coming into contact with the fibers as they are being removed.

In use, an operator detaches the free end of a strand of optic fiber wound around a spool seated on the platform and threads it through the eye and into the entrance to the passage located above the spool tree. As a result, the diameter of the spool tree is limited to a size small enough for a human being to be able to reach the entrance to the passage above the central axis of the spool tree. Additional optic fibers can be removed from other spools on the same tree and either fed directly into the entrance to the passage or tied to a strand of optic fiber that is already being fed into the passage.

As the optic fibers pass through the pipe or passage, they contact the inner surface of the pipe generating friction and heat. When heated, the outer cladding of the fiber becomes sticky or tacky making it more difficult to transport and/or process. This friction can be reduced by placing one or more rollers or ball bearings in contact with the inside of the pipe or passage such that the optic fibers pass over the rollers. Specifically, the passage through which the optic fibers pass is not completely linear, rather, there are parts of it that are curved or bent. Strands of optic fiber passing through these nonlinear portions of the passage are likely to generate more friction than in the straight portions of the passage. In preferred embodiments, rollers are featured in the curved portions of the passage so that the friction generated at these points is reduced. In addition, cold air can be passed into the passage to assist in reducing heat.

In still further embodiments, the passage can be equipped with a blower and/or a venturi vacuum to assist in pulling the optic fibers through the passage. In preferred embodiments, a blower forces air through a multi-port venturi creating suction at the points of entry or openings of the pipe positioned near the spool tree(s). In the inventors' anticipated best mode, the venturi provides suction to more than one, ideally four, spool trees, each with its own entry or port providing access to the pipe or passage mentioned above. Other means of creating suction are also feasible, the venturi being a convenient means of creating the required suction to at least move the free end of the first optic fiber through the passage to the carousel. Once that optic fiber is attached to the carousel, it can be used to pull other optic fibers attached to it through the passage without the use of the vacuum.

At the end of the passage, there is an exit out of which the strands of optic fibers pass. The passage brings the individual strands of optic fibers to a rotating carousel. Initially, one optic fiber is fed into the opening to the transport tube or passage containing the venturi—suction being produced by the venturi. The resulting suction pulls the free end of the first strand of optic fiber through the transport tube or passage towards the carousel. The end of the first strand of optic fiber is attached to the carousel which, when activated, rotates in place around a central axis. As the rotating carousel spins, the strand of optic fiber that is fixed to it is pulled off of its spool through the passage and accumulates on the exterior of the carousel. After the first optic fiber is attached to the carousel, the venturi can be deactivated as suction is no longer needed to pull other strands of optic fiber through the passage. Other strands of optic fiber can be attached to the first strand so they are pulled through the passage by the first strand already attached to the carousel. That way, the carousel helps provide the pulling force necessary to continue pulling optic fiber off of the spools. The carousel features a variable speed drive that allows the user to increase or decrease the speed at which the carousel rotates and thus pulls strands of optic fiber off of the spools. Currently, preferred embodiments can pull 100 to 200 feet of optic fiber per second.

Preferred embodiments of the rotating carousel include retractable rails that can be withdrawn to make it easier for someone to manually pull the strands of optic fibers off of the carousel. In use, the optic fiber accumulates on the outside of the carousel including the retractable rails. The carousel can also feature adjustable handles that protrude horizontally away from the top of the carousel such that they help prevent the fiber from slipping over the top of the carousel when in use. Furthermore, the exit port of the transport passage can lead to a reciprocating tracking unit. This unit moves up and down with respect to the carousel while the optic fibers are passing through the end of the passage or the tracking unit itself allowing the optic fiber to be spread more uniformly on the exterior of the carousel.

Once the strands of optic fiber have been pulled off of their respective spools and wrapped around the exterior of the carousel, the rotation of the carousel is stopped—in preferred embodiments there is a safety brake that allows the user to quickly stop the rotation of the carousel. A single user can then retract the rails and rotate the handles to loosen the accumulated optic fibers and pull them over the top of the carousel to transport them to a storage container.

BRIEF DESCRIPTION OF THE SEVERAL VIEWS OF THE DRAWING(S)

DETAILED DESCRIPTION OF THE INVENTION

Figure 1:
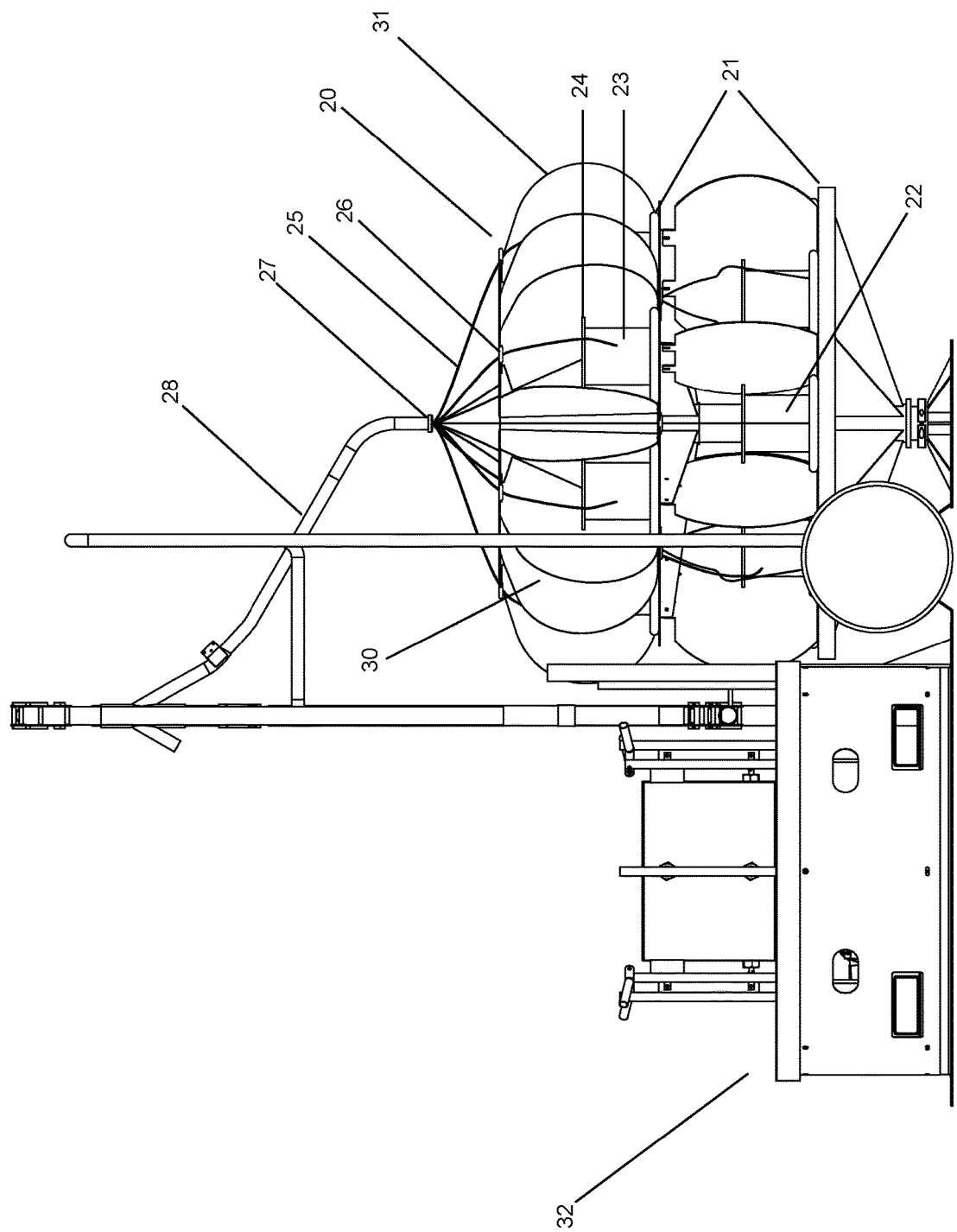
FIG. 1 is a front plan view of the spool tree and carousel used in the disclosed method.

Referring now to the invention in more detail, in FIG. 1 there is shown the spool tree, generally 20, that embodies a number of the novel features of the claimed apparatus and method. More specifically, the spool tree 20 is round structure that generally includes multiple layers or platforms 21 on which spools 22 of optic fiber 25 are positioned. Each spool 22 of optic fiber 25 has a center portion 23 flanked on either end by flanges 24 and in preferred embodiments of the device, are oriented vertically on the spool tree. In this case, vertically oriented means that the spools are turned on their ends such that the longitudinal axis of the center portion 23 of each spool 22 is perpendicular to the plane in which one or more platforms 21 are situated. Thus one of the flanges 24 is adjacent to the platform 21 on which the spool 22 sits and the other is facing away from the same platform 21. Each spool 22 features a strand of optic fiber 25 that is threaded through an eye 26 and then enters the entrance 27 to a passage 28. The passage 28 has an entrance 27 that is located or positioned adjacent to the spool tree 20 such that it can accept a free end of the optic fiber 25 that is passed into the passage 28 as it is removed from each spool 22 and an exit (not shown) that is positioned adjacent to a carousel 32. In preferred embodiments, the entrance 27 to the passage 28 is located above the approximate center of the spool tree 20, i.e. above the central axis around which the spool tree 20 rotates. Further, in preferred embodiments and the inventor's anticipated best mode, the platform 21 is divided into compartments 30 by walls 31 that are also oriented vertically, i.e. perpendicular to the platform(s) (21).

Figure 2:
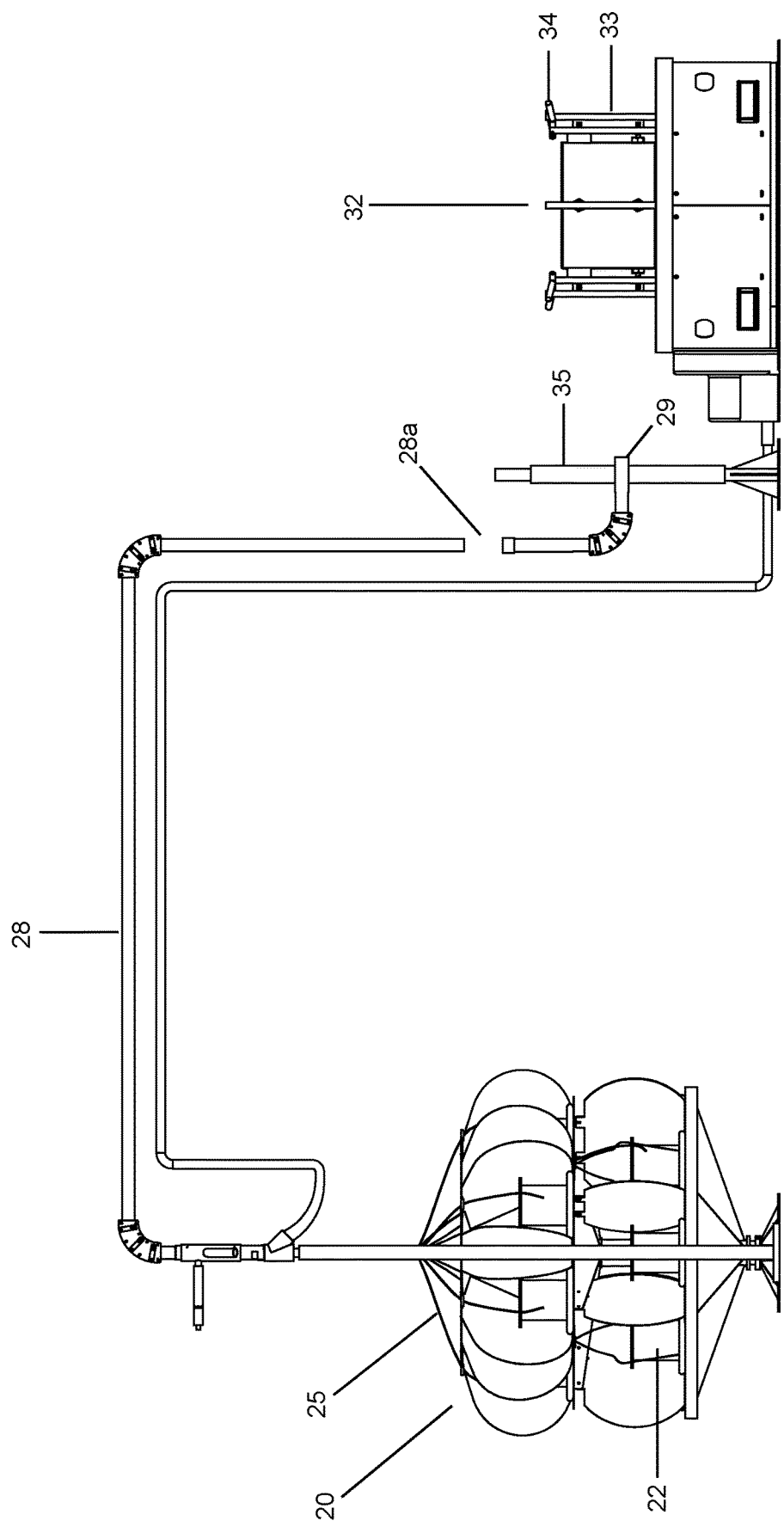
FIG. 2 is a side plan view of the spool tree, carousel and passage used in the disclosed method.

FIG. 2 shows the rotating carousel 32 that gathers the strands of optic fiber 25 after they are removed from the spools 22 on the spool tree 20. The exit 29 of the passage 28 is positioned adjacent to the carousel 32 so that when the optic fiber 25 leaves the passage 28 it is attached to the carousel 32 which collects the strand(s) of optic fiber 25 as the carousel 32 rotates. The carousel also features retractable rails 33 on the exterior of the carousel 32. As the carousel 32 rotates the rails 33 are in an extended position allowing the optic fiber 25 to accumulate on the exterior of the rails 33 and the carousel 32. The carousel 32 can also feature adjustable handles 34 that protrude horizontally away from the top of the carousel 32 such that they help prevent the strands of optic fiber 25 from slipping over the top of the carousel 32 when in use. When the user desires to remove the optic fibers 25 from the carousel 32, he or she rotates the handles 34 and withdraws or retracts the rails 33 allowing the strands of optic fibers 25 to hang loosely from the carousel 32 such that the user can more easily lift the strands of optic fibers 25 off of the carousel 32.

In addition, preferred embodiments include a reciprocating tracking unit 35 that moves the optic fiber(s) 25 up and down relative to the carousel 32 as the optic fiber(s) 25 leave the exit 29 of the passage 28. Including a reciprocating tracking unit 35 requires there be a gap 28a in the passage 28 immediately before the tracking unit 35 so the tracking unit 35 can move up and down relative the carousel 32. Alternately, the passage 28 could featuring telescoping portions that would allow the tracking unit 35 to move up and down and still be attached to the passage 28. The tracking unit 35 thereby causes the optic fiber(s) 25 to accumulate more uniformly around the rails 33 of the carousel 32 rather than accumulating only on part of the exterior of the carousel 32.

Figure 3:
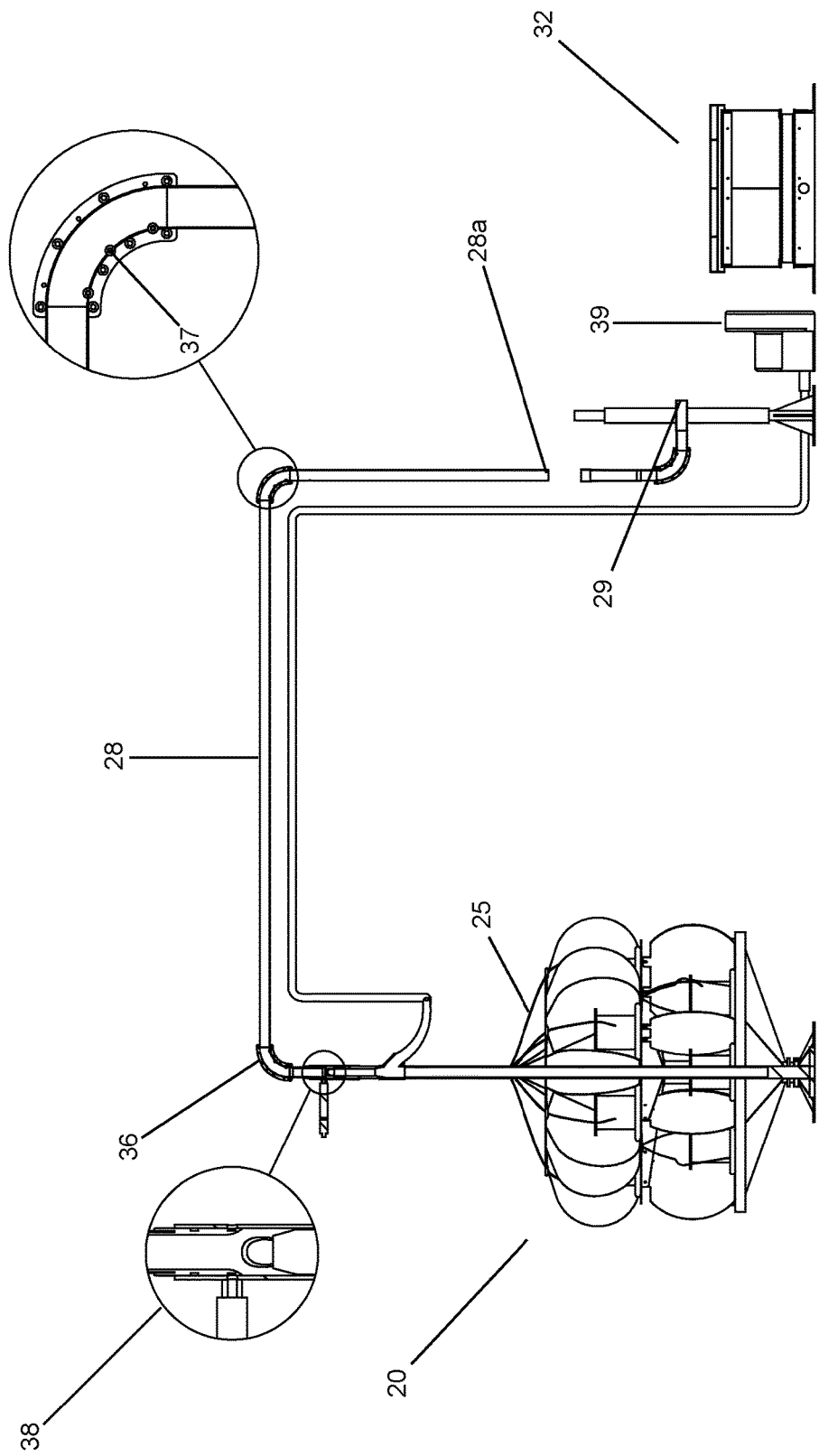
FIG. 3 is a side plan view of the spool tree, carousel and passage showing a cross section of the passage as used in the disclosed method.

FIG. 3 shows a cross section of a portion of the passage 28 through which the optic fiber 25 is transported between the spool tree 20 and the carousel 32. The passage 28 is not entirely straight as it necessarily turns one more times between the spool tree 20 and the carousel 32. In other words, the passage 28 will likely feature one or more curved portions 36. In preferred embodiments and the inventor's anticipated best mode, the curved portion(s) 36 of the passage 28 feature one or more rollers 37. The inventors have found that as the optic fiber passes through the passage 28, it generates friction by coming into contact with the interior of the passage 28. The rollers 37 reduce friction and are primarily, but do not have to be exclusively used in the curved portion(s) 36 of the passage 28.

Figure 4:
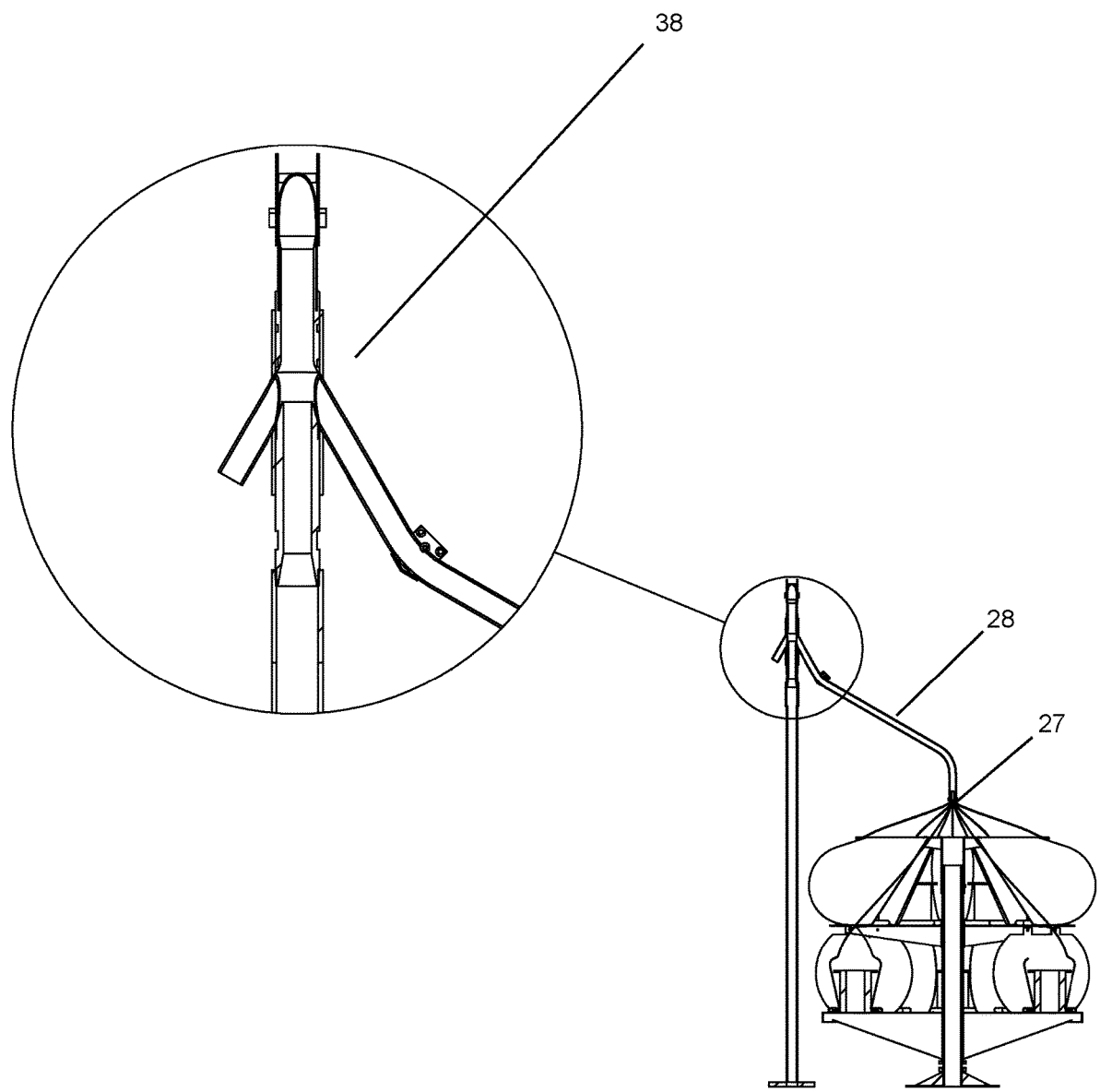
FIG. 4 is shows a cross section of the venturi used in the disclosed method.

FIGS. 3 and 4 also show the passage 28 featuring the venturi or venturi vacuum 38 and a blower 39. The blower 39 forces air through the venturi 38 creating suction. This suction can be used to initiate the de-spooling process by drawing a free end of an optic fiber 25 into the passage 28 through the entrance 27 and then blowing said free end of the optic fiber out of the exit 29 of the passage 28.

In practice, the user begins the process of removing strands of optic fibers 25 from multiple spools 22 without damaging the spools 22 by placing a plurality of spools 22 containing optic fiber 25 on the platform or platforms 21 featured by the spool tree 20. As discussed above, in preferred embodiments, each spool 22 is oriented vertically with respect to the platform 21. The free end of each optic fiber 25 is fed through each eye 26 that is positioned between the spool 22 and the passage entrance 27. In preferred embodiments, each eye 26 is positioned above the spool 22 adjacent to which it is located. In so doing, the optic fiber 25 leaves the spool 22, and enters the entrance 27 of the passage 28 without becoming entangled with the other strands of optic fibers 25 being removed using the same spool tree 20. The optic fiber 25 passes through the passage 28 and out of its exit 29 to contact and engage with the rotating carousel 32.

Once fixed to the carousel 32, the rotation of the carousel 32 causes additional strands of optic fiber 25 to be pulled off of each spool 22, through the passage 28 and out of the exit 29 of the passage 28. As the carousel 32 rotates, the optic fiber 25 wraps around the exterior of the carousel 32. Once a desired amount of optic fiber 25 has been removed from the spools 22, the user stops the rotation of the carousel 32 and removes the optic fiber 25 from the carousel 32. In preferred embodiments, the carousel features retractable rails 33 that extend upward away from the base of the carrousel 32 and provide a surface around which the optic fibers 25 can accumulate. Once the rails 33 are retracted or withdrawn, the optic fiber 25 hangs more loosely from the carousel 32 making it easier for the user to lift it over the top of the carousel 32.

The advantages of the present invention include, without limitation, the ability to remove or de-spool optic fibers from the spools on which they are stored quickly and efficiently, with a minimum of human labor. In addition, the advantages of this invention include the ability to de-spool several spools of optic fiber at the same time. Further, this invention provides a method for collecting optic fibers for use in other applications.

Reference throughout the specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout the specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

It is understood that the above described embodiments are only illustrative of the application of the principles of the present invention. The present invention may be embodied in other specific forms without departing from its spirit or essential characteristics. The described embodiment, including the best mode, is to be considered in all respects only as illustrative and not restrictive. The scope of the invention is, therefore, indicated by the appended claims, if any, in conjunction with the foregoing description.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

We claim:

1. A method of removing strands of optic fiber from one or more spools on which the fibers are stored without damaging the spools comprising:
    placing a plurality of spools each containing a strand of optic fiber on a plurality of annular platforms fixed to a tree having a vertical axis around which the tree can be rotated;
    feeding a free end of a first strand of optic fiber from one of the plurality of spools into an entrance of a continuous passage, said continuous passage having an entrance positioned adjacent to the tree;
    activating a blower operably connected to the continuous passage to create suction in the continuous passage and using that suction to move the free end of the first strand of optic fiber to a venturi;
    blowing air through the venturi thereby forcing the free end of the first strand of optic fiber through the continuous passage and out of a passage exit positioned adjacent to a rotating carousel;
    attaching the free end of the first strand of optic fiber to the rotating carousel such that the first stand of optic fiber accumulates on an exterior of the carousel as the carousel rotates;
    attaching a free end of each of the strands of optic fiber from the plurality of other spools to the first strand of optic fiber such that each strand of optic fiber from the plurality of other spools is pulled into the continuous passage by the first strand of optic fiber; and
    rotating the carousel such that the strands of optic fiber from the plurality of spools wrap around an exterior of the carousel.

2. The method of claim 1 further comprising:
    positioning rollers within the continuous passage such that each strand of optic fiber contacts the rollers as it moves through the continuous passage.

3. The method of claim 2 further comprising turning the blower off after attaching the free end of the first strand of optic fiber to the exterior of the carousel.

4. The method of claim 1 further comprising wrapping each strand of optic fiber around retractable rails featured by the carousel; wherein the rails are retracted prior to removing each strand of optic fiber from the carousel.

5. The method of claim 4 further comprising preventing each strand of optic fiber from slipping off of the exterior of the carousel using movable handles wherein the handles are featured by the carousel and wherein the handles are rotated prior to removing each strand of optic fiber from the carousel.

6. The method of claim 4 further comprising separating the first spool and each of the plurality of spools on the plurality of annular platforms from each other by placing walls between the first spool and each of the plurality of spools forming compartments featured by the platform.

7. The method of claim 6 further comprising passing a free end of each of the strands of optic fiber through an eye located adjacent to each compartment before each strand of optic fiber enters the continuous passage.

8. A method of removing strands of optic fiber from one or more spools on which the fibers are stored without damaging the spools comprising:
    placing a first spool containing a first strand of optic fiber on an annular platform fixed to a tree having an axle around which the tree can be rotated;
    placing a plurality of other spools each containing a strand of optic fiber on one or more annular platforms fixed to the tree;
    feeding a free end of the first strand of optic fiber through one of a plurality of eyes featured adjacent to the at least one platform;
    feeding the free end of the first strand of optic fiber into an entrance of a continuous passage, said continuous passage having an entrance positioned adjacent to the tree;
    using a blower to blow air into the continuous passage to create suction in the continuous passage and using the suction to move the free end of the first strand of optic fiber through the continuous passage and out of the passage exit; and
    attaching the free end of the first strand of optic fiber to a rotating carousel such that the first strand of optic fiber accumulates on an exterior of the carousel as the carousel rotates;
    attaching a free end of each of the strands of optic fiber from the plurality of other spools to the first strand of optic fiber such that each strand of optic fiber from the plurality of other spools is pulled into the continuous passage by the first strand of optic fiber;
    positioning rollers within the continuous passage such that all of the strands of optic fiber contact the rollers as they move through the continuous passage;
    spreading all of the strands of optic fiber from the first spool and the plurality of other spools leaving the exit of the continuous passage across the exterior of the carousel using a reciprocating tracking unit;
    rotating the carousel such that all of the strands of optic fiber from the first spool and the plurality of other spools wrap around retractable rails featured by the carousel;
    stopping the rotation of the carousel;
    retracting rails featured by the carousel; and
    removing all of the strands of optic fiber from the first spool and the plurality of other spools that have accumulated on the carousel.

* * * * *